(12) United States Patent
Agiwal et al.

(10) Patent No.: US 12,120,568 B2
(45) Date of Patent: Oct. 15, 2024

(54) METHOD AND APPARATUS FOR SYSTEM INFORMATION ACQUISITION, BEAM FAILURE RECOVERY AND CELL RESELECTION

(71) Applicant: Samsung Electronics Co., Ltd., Suwon-si (KR)

(72) Inventors: Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/528,089

(22) Filed: Dec. 4, 2023

(65) Prior Publication Data

US 2024/0114412 A1 Apr. 4, 2024

Related U.S. Application Data

(63) Continuation of application No. 18/084,046, filed on Dec. 19, 2022, now Pat. No. 11,838,817, which is a
(Continued)

(51) Int. Cl.
*H04W 36/08* (2009.01)
*H04L 5/00* (2006.01)
(Continued)

(52) U.S. Cl.
CPC ........... *H04W 36/08* (2013.01); *H04L 5/0055* (2013.01); *H04W 24/08* (2013.01); *H04W 72/23* (2023.01);
(Continued)

(58) Field of Classification Search
CPC ..... H04W 36/08; H04W 24/08; H04W 72/04; H04W 74/08; H04W 76/11; H04W 76/27;
(Continued)

(56) References Cited

U.S. PATENT DOCUMENTS 9,155,107 B2 * 10/2015 Chen ................... H04W 74/006
2012/0099515 A1    4/2012 Chen et al.
(Continued)

FOREIGN PATENT DOCUMENTS

EP      3537825 A1   9/2019
RU      2658340 C1   6/2018
(Continued)

OTHER PUBLICATIONS

"5G; NR; Radio Resource Control (RRC); Protocol specification (3GPP TS 38.331 version 15.2.1 Release 15)", ETSI TS 138 331 V15.2.1, Jun. 29, 2018.
(Continued)

*Primary Examiner* — Kyaw Z Soe
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. An apparatus, a method and a system for system information acquisition, beam failure recovery, and cell reselection in wireless communication system are provided.

20 Claims, 16 Drawing Sheets

Related U.S. Application Data continuation of application No. 17/379,163, filed on Jul. 19, 2021, now Pat. No. 11,533,665, which is a continuation of application No. 16/571,985, filed on Sep. 16, 2019, now Pat. No. 11,071,030.

(60) Provisional application No. 62/732,168, filed on Sep. 17, 2018.

(51) Int. Cl.
| | | |
|---|---|---|
| *H04W 24/08* | (2009.01) | |
| *H04W 72/23* | (2023.01) | |
| *H04W 74/0833* | (2024.01) | |
| *H04W 76/11* | (2018.01) | |
| *H04W 76/27* | (2018.01) | |
| *H04W 80/02* | (2009.01) | |

(52) U.S. Cl.
CPC ........ *H04W 74/0833* (2013.01); *H04W 76/11* (2018.02); *H04W 76/27* (2018.02); *H04W 80/02* (2013.01)

(58) Field of Classification Search
CPC .............. H04W 80/02; H04W 74/0833; H04W 72/042; H04W 48/14; H04L 5/00; H04L 5/0055
See application file for complete search history.

(56) References Cited

U.S. PATENT DOCUMENTS

| | | | |
|---|---|---|---|
| 2017/0237546 A1 | 8/2017 | Yang et al. | |
| 2017/0311290 A1 | 10/2017 | Adjakple et al. | |
| 2017/0318577 A1 | 11/2017 | Yang et al. | |
| 2018/0220288 A1 | 8/2018 | Agiwal et al. | |
| 2018/0310235 A1 | 10/2018 | You et al. | |
| 2019/0268922 A1 | 8/2019 | He et al. | |
| 2020/0383137 A1* | 12/2020 | Song | H04W 74/0833 |
| 2021/0243782 A1 | 8/2021 | Miao | |

FOREIGN PATENT DOCUMENTS

| | | |
|---|---|---|
| WO | 2017/113279 A1 | 7/2017 |
| WO | 2018/082494 A1 | 5/2018 |

OTHER PUBLICATIONS

Samsung, "RIL #TBD SI Window Monitoring for On Demand SI Message Acquisition", R2-1811113, 3GPP TSG-RAN2 103, Aug. 10, 2018.
ZTE Corporation, "Draft CR for Cell reselection during on-demand system information acquisition (RIL660)", R2-1811489, 3GPP TSG-WG2 Meeting #AH-1807', Aug. 9, 2018.
International Search Report dated Dec. 24, 2019, issued in International Application No. PCT/KR2019/011939.
Xiaomi Communications, "Further issues relates to on-demand SI", 3GPP TSG-RAN2 #102, R2-1807673, Busan, Korea, May 21-May 25, 2018, May 10, 2018.
ZTE Corporation et al., "Cell reselection during on-demand system information acquisition(Z660)", 3GPP TSG-WG2 Meeting #103, Gothenburg, Sweden, Aug. 20-24, 2018, R2-1811488.
Extended European Search Report dated Oct. 7, 2021, issued in European Application No. 19862954.5-1212.
Chinese Office Action dated Nov. 3, 2021, issued in Chinese Application No. 201980060918.6.
Russian Notice of Allowance dated Oct. 22, 2021, issued in Russian Application No. 2021106722/07(014500).
Indian Office Action dated Sep. 21, 2022; Indian Appln. No. 202137002859.
ITRI; Correction to BFR procedure upon BWP switching; 3GPP TSG-RAN2 Meeting #103; R2-1812702; Gothenburg, Sweden; Aug. 20-24, 2018; XP051522296; Aug. 10, 2018.
CATT; Corrections for BFR support; 3GPP TSG-RAN WG2#101bis; R2-1804514; Sanya, China; Apr. 16-20, 2018; XP051428245; Apr. 14, 2018.
LG Electronics Inc .; BWP operation for BFR RA; 3GPP TSG-RAN WG2 Meeting #103; R2-1812639; Gothenburg, Sweden; Aug. 20-24, 2018; XP051522233; Aug. 10, 2018.
Extended European Search Report dated Jul. 9, 2024; European Appln. No. 23214395.8-1215 / 4307770.

* cited by examiner

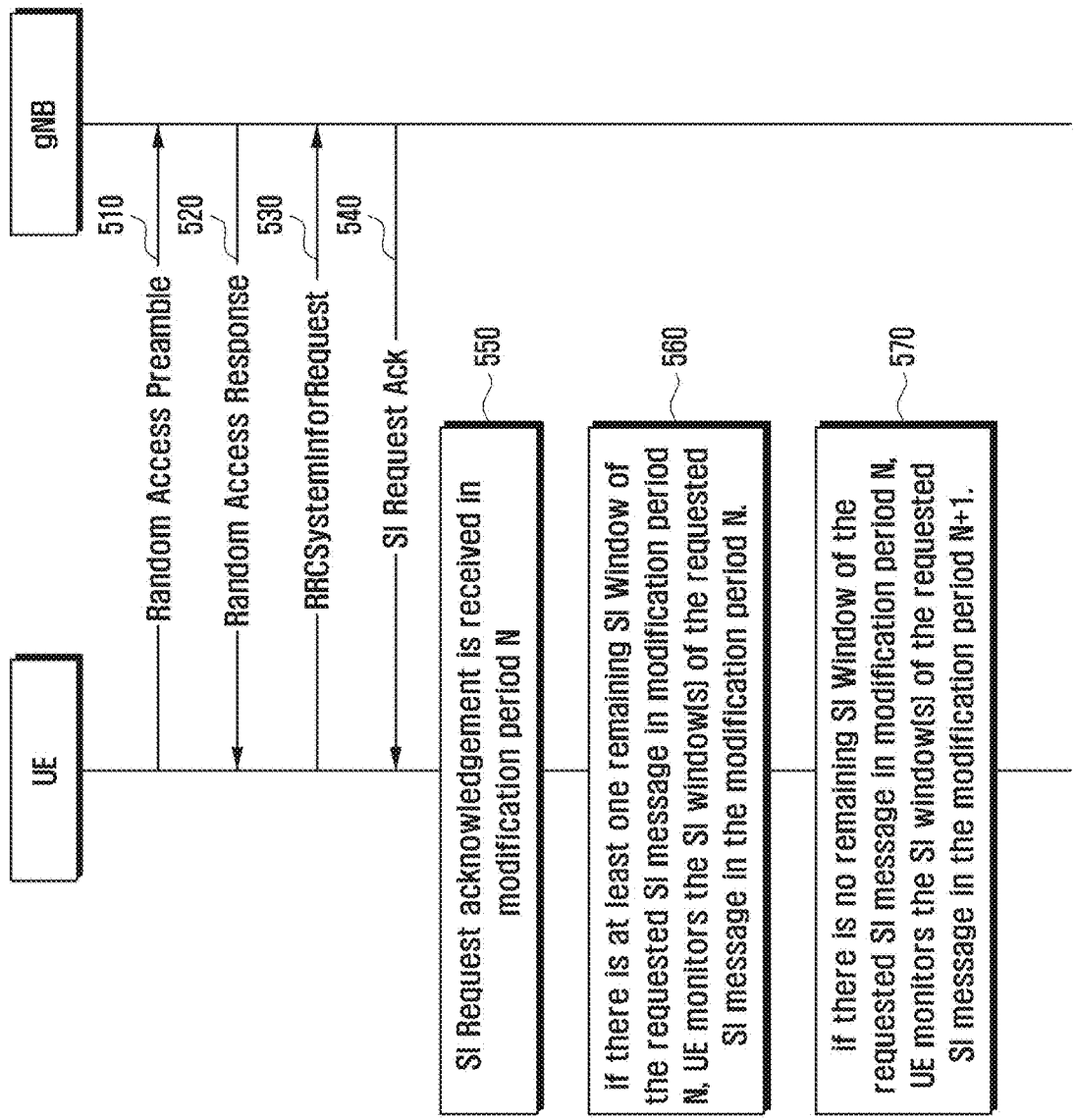

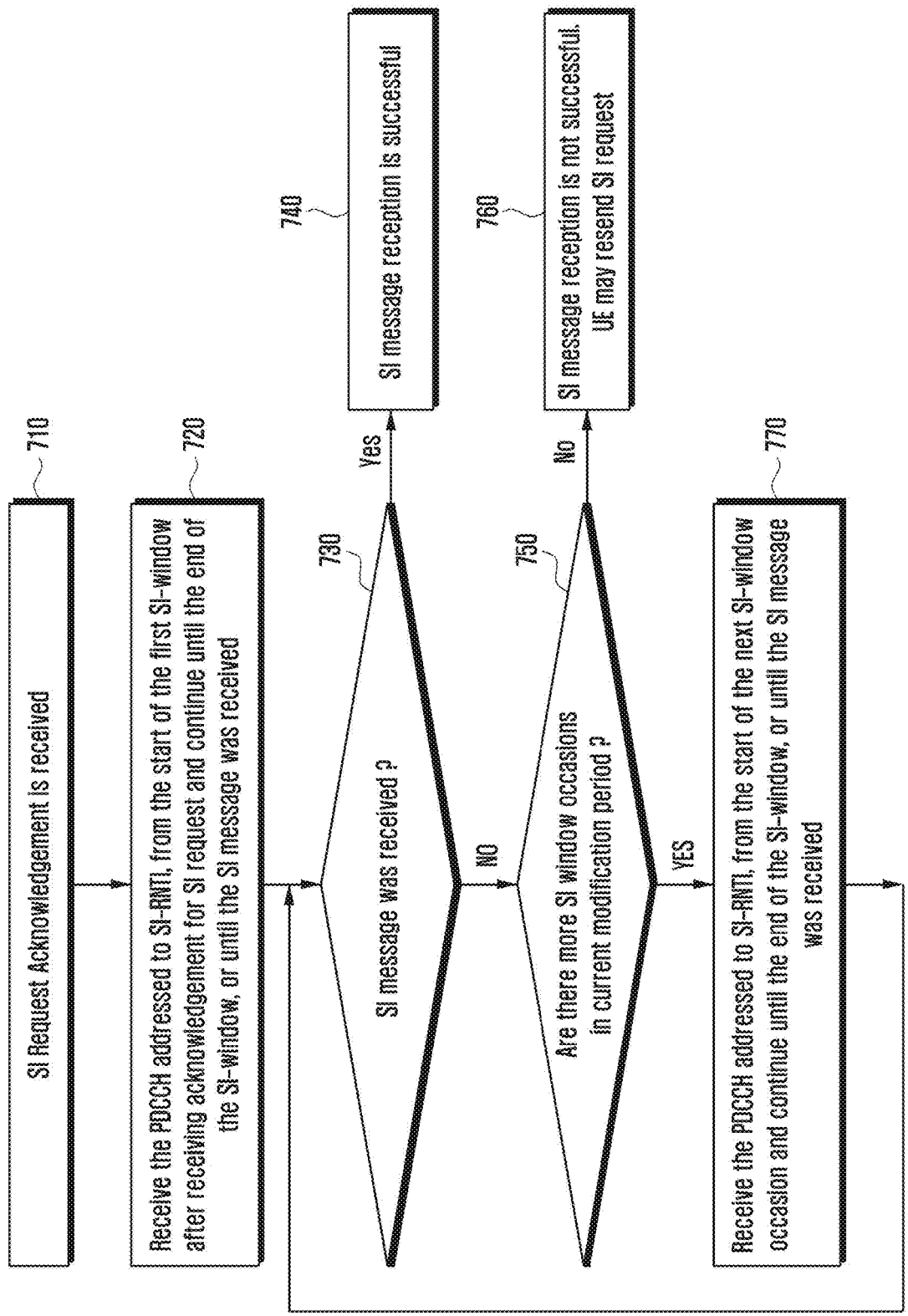

METHOD AND APPARATUS FOR SYSTEM INFORMATION ACQUISITION, BEAM FAILURE RECOVERY AND CELL RESELECTION

CROSS-REFERENCE TO RELATED APPLICATION(S)

This application is a continuation application of prior application Ser. No. 18/084,046 filed on Dec. 19, 2022, which issued as U.S. Pat. No. 11,838,817 on Dec. 5, 2023; which is a continuation application of prior application Ser. No. 17/379,163 filed on Jul. 19, 2021, which issued as U.S. Pat. No. 11,533,665 on Dec. 20, 2022; which is a continuation application of prior application Ser. No. 16/571,985 filed on Sep. 16, 2019, which issued as U.S. Pat. No. 11,071,030 on Jul. 20, 2021; and which is based on and claims priority under 35 U.S.C. § 119(e) of a U.S. Provisional application Ser. No. 62/732,168 filed on Sep. 17, 2018, in the U.S. Patent and Trademark Office, the disclosure of each of which is incorporated by reference herein in its entirety.

BACKGROUND

1. Field

The disclosure relates to a wireless communication system. More particularly, the disclosure relates to an apparatus, a method and a system for system information acquisition, beam failure recovery and cell reselection in wireless communication system.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there have been various studies on system acquisition, beam failure recovery, and cell reselection in 5G communication system recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Additional aspects will be set forth in part in the description which follows and, in part, will be apparent from the description, or may be learned by practice of the presented embodiments.

In accordance with an embodiment of the disclosure, a method comprises: transmitting, to a base station, a request for system information (SI); receiving, from the base station, an acknowledgement for the request; receiving a physical downlink control channel (PDCCH) addressed to an SI radio network temporary identifier (RNTI) in a first SI window for an SI message immediately after receiving the acknowledgement; and receiving the SI message, wherein receiving of a PDCCH is performed in a second SI window which is next to the first SI window in a modification period, in case that the SI message is not received by an end of the first SI window.

In accordance with another embodiment of the disclosure, a method comprises: receiving, from a terminal, a request for system information (SI); transmitting, to the terminal, an acknowledgement for the request; and transmitting, to the terminal, a physical downlink control channel (PDCCH)

addressed to an SI radio network temporary identifier (RNTI) in a first SI window for an SI message, wherein the first SI window is monitored by the terminal for the SI message immediately after receiving the acknowledgement, and wherein the receiving of a PDCCH is performed in a second SI window which is next to the first SI window in a modification period, in case that the SI message is not transmitted to the terminal by an end of the first SI window.

In accordance with another embodiment of the disclosure, a terminal comprises: a transceiver configured to transmit and receive an signal; and a controller configured to: transmit, to a base station, a request for system information (SI), receive, from the base station, an acknowledgement for the request, receive a physical downlink control channel (PDCCH) addressed to an SI radio network temporary identifier (RNTI) in a first SI window for an SI message immediately after receiving the acknowledgement, and receive the SI message, wherein receiving of a PDCCH is performed in a second SI window which is next to the first SI window in a modification period, in case that the SI message is not received by an end of the first SI window.

In accordance with another aspect of the disclosure, a base station comprises: a transceiver configured to transmit and receive an signal; and a controller configured to: receive, from a terminal, a request for system information (SI), transmit, to the terminal, an acknowledgement for the request, and transmit, to the terminal, a physical downlink control channel (PDCCH) addressed to an SI radio network temporary identifier (RNTI) in a first SI window for an SI message, wherein the first SI window is monitored by the terminal for the SI message immediately after receiving the acknowledgement, and wherein receiving of a PDCCH is performed in a second SI window which is next to the first SI window in a modification period, in case that the SI message is not transmitted to the terminal by an end of the first SI window.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates another example of monitoring SI window according to an embodiment of the disclosure;

FIG. 7 illustrates another example of monitoring SI window according to an embodiment of the disclosure;

Throughout the drawings, like reference numerals will be understood to refer to like parts, components, and structures.

DETAILED DESCRIPTION

Figure 1:
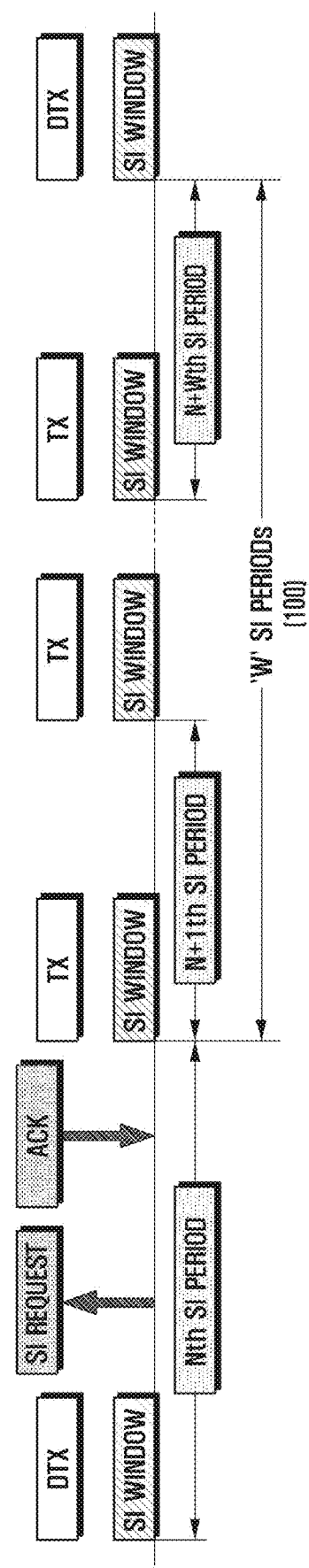
FIG. 1 illustrates an example of monitoring system information (SI) window according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general-purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. Thus, a fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer.

Example use cases the fifth generation wireless communication system wireless system are expected to address is enhanced Mobile Broadband (eMBB), massive Machine Type Communication (m-MTC), ultra-reliable low latency communication (URLLC) etc. The eMBB requirements like tens of Gbps data rate, low latency, high mobility so on and so forth address the market segment representing the wireless broadband subscribers needing internet connectivity everywhere according to the related art, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

Embodiment 1—On-Demand SI Acquisition

FIG. 1 illustrates an example of monitoring system information (SI) window according to an embodiment of the disclosure.

In fifth generation (also referred as NR or New Radio) wireless communication system, system information is divided into minimum SI (comprising of master information block (MIB) and system information block 1 (SIB1)) and other SI (SIB 2, SIB 3 and so on). SIBs other than SIB1 are carried in SystemInformation (SI) messages, which are transmitted on the downlink shared channel (DL-SCH). SIBs having the same periodicity can be mapped to the same SI message. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (physical random access channel (PRACH) preamble(s) and PRACH resource/occasion(s)) for requesting gNB to broadcast one or more SI message(s). gNB can signal random access resources for each SI message which is not being broadcasted. Alternately gNB can signal random access resources which are common for all SI messages which are not being broadcasted.

If UE requires an SI message to operate in cell and that SI message is not being broadcasted, the UE shall:

If SIB1 received from gNB includes information on random access resources (PRACH preamble(s) and PRACH resource(s)) for requesting SI, UE (i.e., radio resource control (RRC) layer) initiates the Random Access procedure using the PRACH preamble(s) and PRACH resource(s) the SI message which UE wants to request and waits for acknowledgement for SI request from a lower layer (i.e., medium access control (MAC) layer). If acknowledgement for the SI request is received from lower layer, UE monitors the SI window of the requested SI message in one or more SI period(s) of that SI message.

During the random access procedure, UE transmits Msg1 (i.e., Random access preamble) using the random access resources corresponding to the SI message which UE wants to request Upon receiving the Msg1, based on received preamble and PRACH occasion in which preamble is received, gNB identifies that Msg1 is an SI request and it transmits SI request acknowledgement. SI request acknowledgement is included in random access response (also referred as Msg2). For SI request acknowledgement the Msg2 MAC protocol data unit (PDU) includes a MAC subPDU having a MAC subheader only and this MAC subheader includes random access preamble identifier (RAPID) of received preamble. After transmitting Msg1, UE waits for Msg2 corresponding to the transmitted random access preamble in a response window. Upon receiving Msg2 wherein the Msg2 includes a MAC subPDU having a MAC subheader only and this MAC subheader includes RAPID of transmitted preamble, acknowledgement for the SI request is considered to be received by the UE (i.e., MAC layer) and then MAC layer informs RRC that SI request acknowledgement is received.

If SIB1 received from gNB does not include information on random access resources (PRACH preamble(s) and PRACH resource(s)) for requesting SI, UE initiates transmission of RRCSystemInfoRequest message (i.e., RRC message) and waits for acknowledgement for SI request (i.e., RRCSystemInfoRequest message) from lower layer (i.e., MAC). If acknowledgement for SI request (i.e., RRCSystemInfoRequest message) is received from lower layer, UE monitors the SI window of the requested SI message in one or more SI period(s) of that SI message.

During the random access procedure, UE transmits Msg1 (i.e., Random access preamble) and waits for random access response (also referred as Msg2) corresponding to the transmitted random access preamble. Random access response (also referred as Msg2) corresponding to the transmitted random access preamble is considered successfully received by UE if Msg2 includes a MAC subPDU having a MAC subheader and payload (i.e., MAC RAR) where MAC subheader includes the RAPID of the transmitted random access preamble. MAC RAR includes uplink (UL) grant, TA, TC-RNTI. In the UL grant received in successfully received random access response (Msg2), UE transmits Msg3. Msg3 includes common control channel (CCCH) SDU wherein the CCCH SDU includes RRCSystemInfoRequest message. After transmitting the Msg3, UE waits for Msg4 including the contention resolution identity which matches the first 48 bits of CCCH SDU transmitted in Msg3. If UE receives such Msg4 after transmitting the CCCH SDU including RRCSystemInfoRequest message, acknowledgement for the SI request is considered to be received by the UE (i.e., MAC layer) and MAC layer informs RRC that SI request acknowledgement is received.

The issue with above procedure is that UE is not aware of the SI period(s) in which requested SI message will be transmitted after UE receives acknowledgement for SI request. UE unnecessarily monitoring SI windows of requested SI message in several SI periods leads to a power consumption of the UE. In the standardization discussion it was proposed that after receiving the SI request ack, UE monitors up to 'W' SI periods (100), where a value of the 'W' is signaled by gNB. W SI periods start from earliest SI period which starts at least X ms further away from the instant in which acknowledgment for SI request is received. The issue with this approach is that it requires signaling of the additional parameter 'W'. Signaling of additional parameter increases the signaling overhead of SIB 1.

Hereinafter, various embodiments according to the disclosure are explained in detail.

Embodiment 1-1

Figure 2:
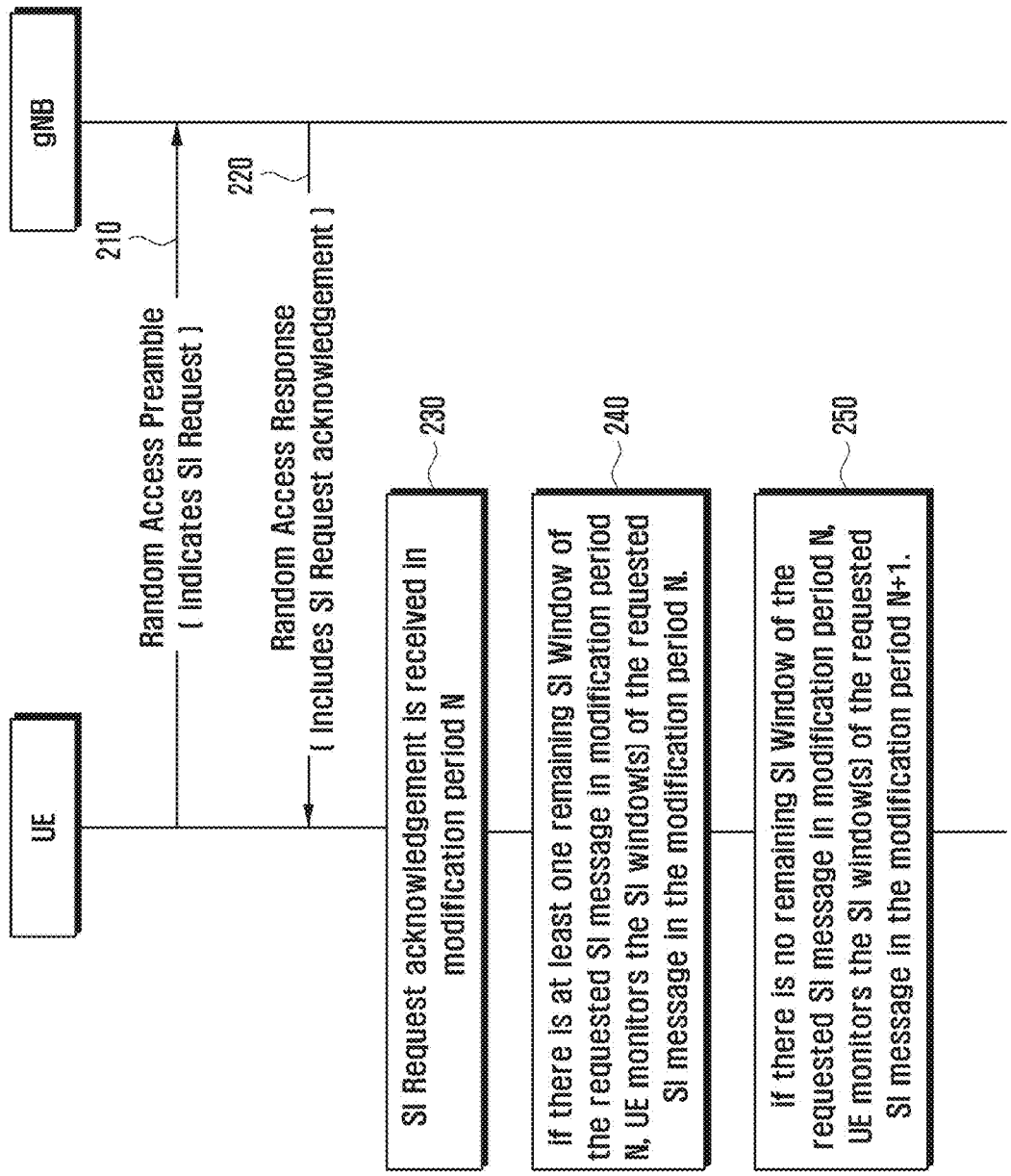
FIG. 2 illustrates another example of monitoring SI window according to an embodiment of the disclosure.
Figure 3:
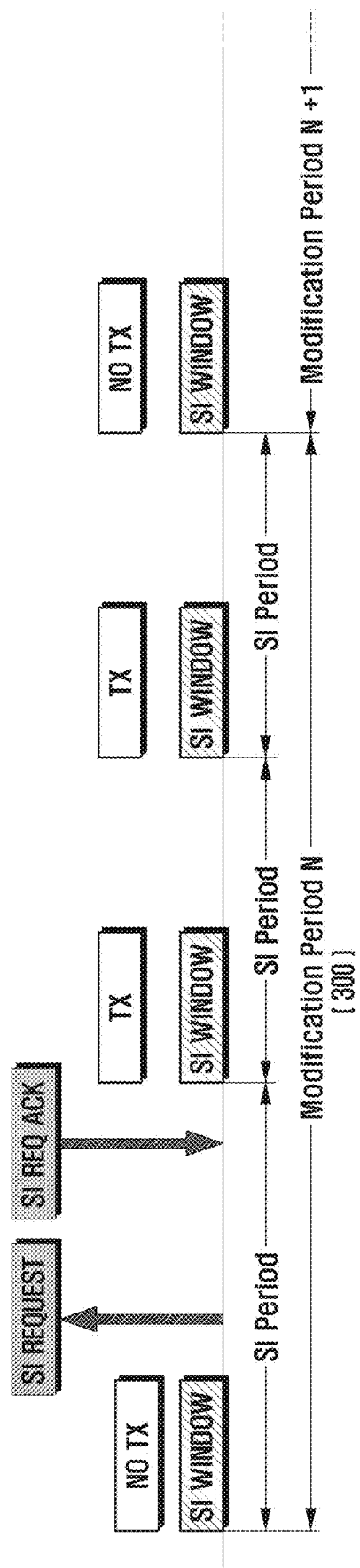
FIG. 3 illustrates another example of monitoring SI window according to an embodiment of the disclosure.
Figure 4:
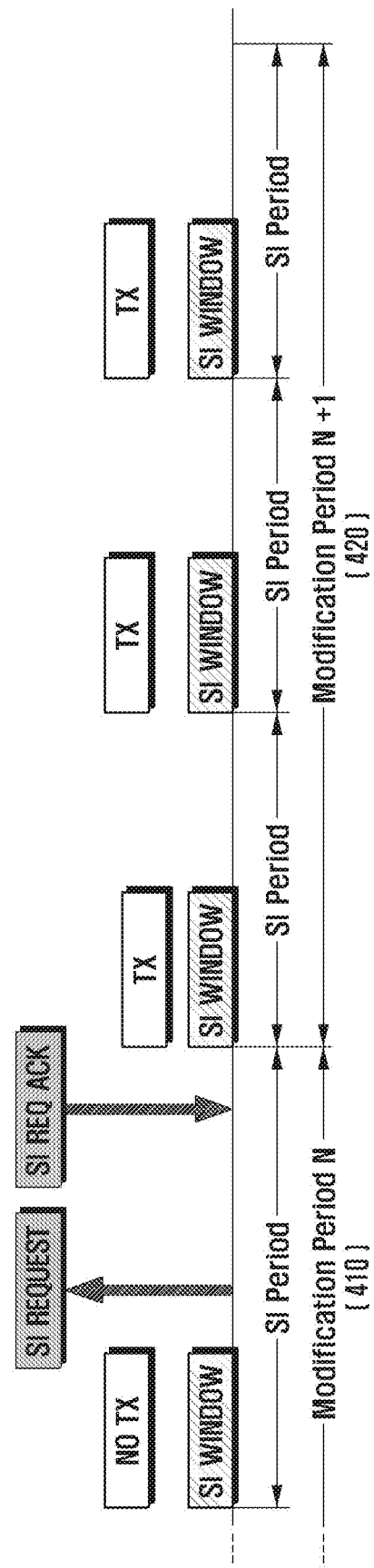
FIG. 4 illustrates another example of monitoring SI window according to an embodiment of the disclosure.

FIGS. 2, 3, and 4 illustrate other examples of monitoring SI window according to various embodiments of the disclosure.

If SIB1 received from gNB includes information on random access resources (PRACH preamble(s) and PRACH resource(s)) for requesting SI, UE initiates the Random Access procedure using the PRACH preamble(s) and PRACH resource(s) indicated by the information in the SI message (210). For example, UE transmits Msg1 (i.e., Random access preamble) to the gNB and waits for acknowledgement for SI request. To overcome the above mentioned issue, it is proposed that after receiving acknowledgment for SI request (220), UE determines the SI window(s) to monitor as follows:

After receiving acknowledgment for SI request in modification period N (230):
if there is at least one remaining SI Window of the requested SI message in modification period N, UE monitors the SI window(s) of the requested SI message in the modification period N (240, 300). This procedure is also illustrated in FIG. 3. Meanwhile, a modification period is defined as follows:

The modification period is configured by system information. The modification period boundaries are defined by SFN values for which SFN mod m=0, where m is the number of radio frames comprising the modification period. For an SI message, location of SI windows are determined as follows: the SI-window starts at the slot #a, where a=x mod N, in the radio frame for which SFN mod T=FLOOR (x/N), where T is the periodicity of the concerned SI message and N is the number of slots in a radio frame, x is equal to (n−1)*w, w is the SI window length, n is the index of SI message in list of SI messages in SIB 1.

Otherwise, i.e., if there is no remaining SI window of the request SI message in modification period N (250, 410), UE monitors the SI window(s) of the requested SI message in the modification period N+1 (250, 420). This procedure is also illustrated in FIG. 4.

FIG. 5 illustrates another example of monitoring SI window according to an embodiment of the disclosure.

If SIB1 received from gNB does not include information on random access resources (PRACH preamble(s) and PRACH resource(s)) for requesting SI, UE initiates a transmission of RRCSystemInfoRequest message to the gNB. UE transmits Msg1 (i.e., Random access preamble) and waits for random access response (510, 520). In the UL grant received in the received random access response, UE transmits RRCSystemInfoRequest message (i.e., Msg3) and waits for acknowledgement for the Msg3 which is an SI request (i.e., RRCSystemInfoRequest message) (530, 540). To overcome the issue, it is proposed that after receiving acknowledgment for SI request (550), UE determines the SI window(s) to monitor as follows:

After receiving acknowledgment for SI request in modification period N:
  if there is at least one remaining SI Window of the requested SI message in modification period N, UE monitors the SI window(s) of the requested SI message in the modification period N (560, 300). This procedure is also illustrated in the above described FIG. 3.
  Otherwise, i.e., if there is no remaining SI window of the request SI message in modification period N (570, 410), UE monitors the SI window(s) of the requested SI message in the modification period N+1 (570, 420). This procedure is also illustrated in the above described FIG. 4.

It is to be noted that procedure explained in FIGS. 3 and 4 can also be used upon receiving acknowledgment for SI request wherein SI request is transmitted to gNB using dedicated RRC signaling message wherein RRCSystemInfoRequest is transmitted in dedicated UL grant. In this case SI request acknowledgement can be an RRC message or RRC Reconfiguration message. FIGS. 3 and 4 can also be used upon receiving acknowledgment for SI request wherein SI request is transmitted to gNB in MsgA of 2 step contention based random access procedure. In two step CBRA, first message (i.e., MsgA) consists of random access preamble transmitted on PRACH occasion and MAC PDU transmitted in a physical uplink shared channel (PUSCH) occasion. MAC PDU includes CCCH SDU which includes RRCSystemInfoRequest. In response to MsgA UE receives MsgB. In this case SI request acknowledgment is MsgB. MsgB including the contention resolution identity which matches the first 48 bits of CCCH SDU transmitted in MsgA is considered as SI request acknowledgment.

Figure 6A:
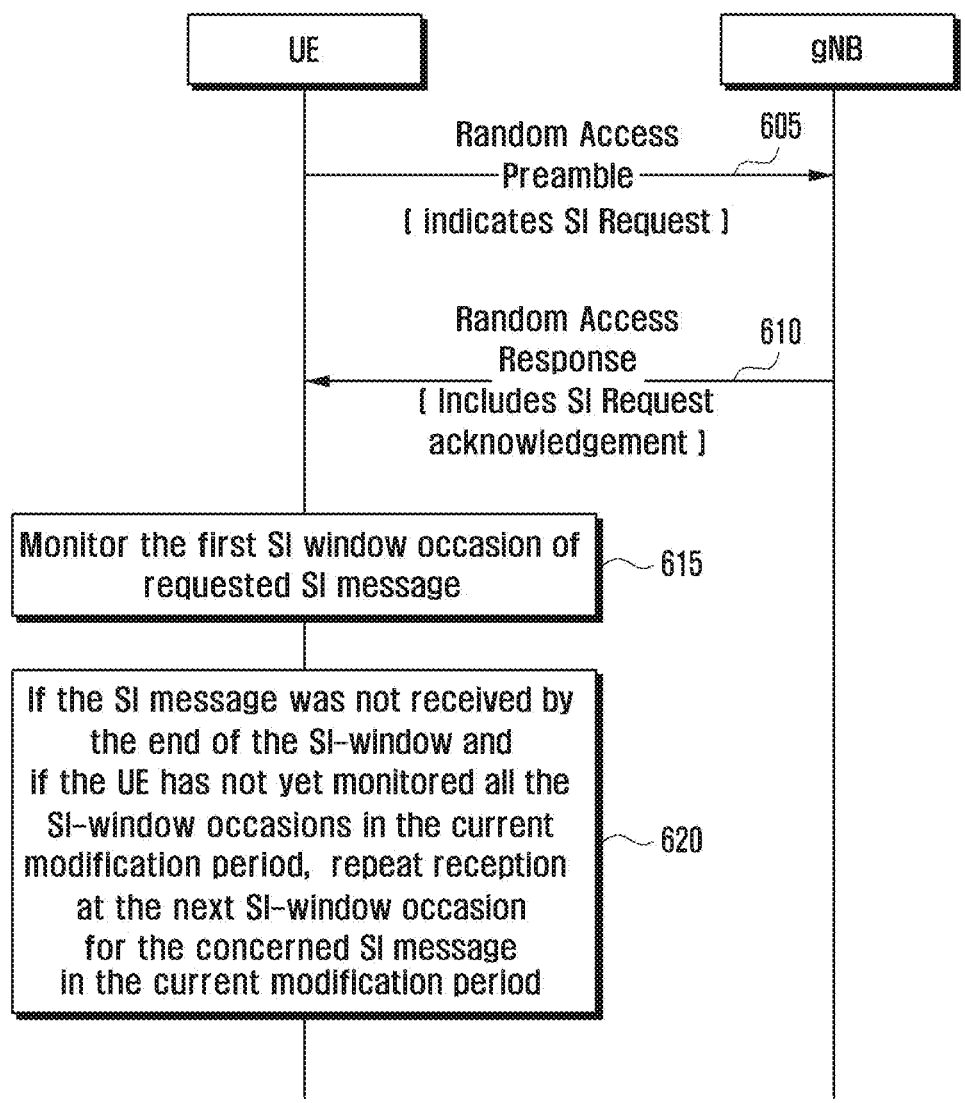
FIGS. 6A and 6B illustrate other examples of monitoring SI window according to an embodiment of the disclosure.
Figure 6B:
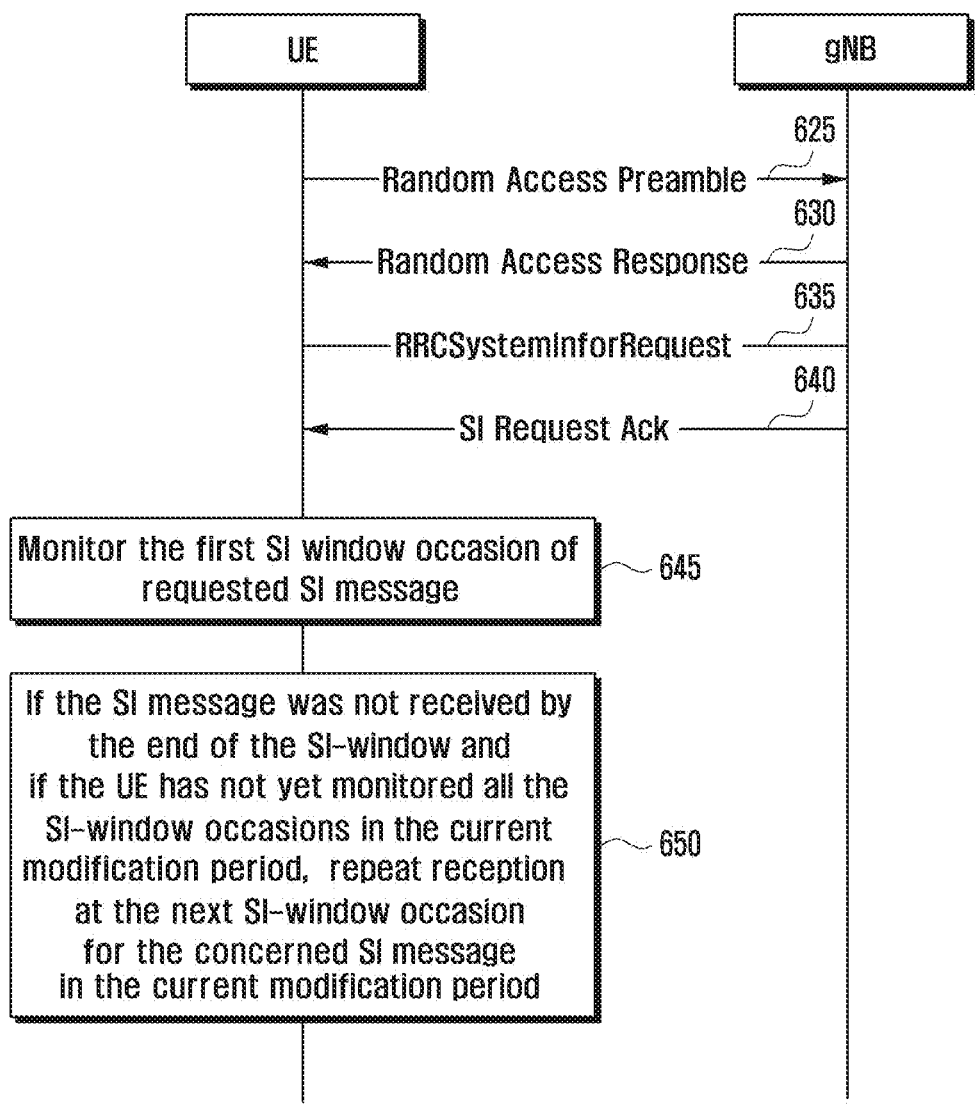

FIGS. 6A and 6B illustrate other examples of monitoring SI window according to an embodiment of the disclosure.

Referring to FIG. 6A, if SIB1 broadcasted from gNB includes information on random access resources (PRACH preamble(s) and PRACH resource(s)) for requesting SI, UE initiates the Random Access procedure using the PRACH preamble(s) and PRACH resource(s) indicated by the information in the SI message (605). For example, UE transmits Msg1 (i.e., Random access preamble) to the gNB and waits for acknowledgement for SI request (610).

Referring to FIG. 6B, if SIB1 broadcasted from gNB does not include information on random access resources (PRACH preamble(s) and PRACH resource(s)) for requesting SI, UE initiates a transmission of RRCSystemInfoRequest message to the gNB. UE transmits Msg1 (i.e., Random access preamble) and waits for random access response (625, 630). In the UL grant received in the received random access response, UE transmits RRCSystemInfoRequest message (i.e., Msg3) and waits for acknowledgement for the Msg3 which is an SI request (i.e., RRCSystemInfoRequest message) (635, 640).

Referring to FIG. 6A or 6B, after receiving the acknowledgement for SI request, for acquiring the requested SI message, UE shall receive the physical downlink control channel (PDCCH) containing a scheduling radio network temporary identifier (RNTI), i.e., system information RNTI (SI-RNTI). That is, the UE monitors the PDCCH by decoding the PDCCH with the SI-RNTI, from the start of the first SI-window after receiving acknowledgment for SI request and continues until the end of the SI-window whose absolute length in time is given by si-WindowLength, or until the SI message was received (615, 645).

If the SI message was not received by the end of the SI-window and if the UE has not yet monitored all the SI-window occasions in the current modification period, the UE repeats reception at the next SI-window occasion for the concerned SI message in the current modification period (620, 650).

FIG. 7 illustrates another example of monitoring SI window according to an embodiment of the disclosure.

An acknowledgement for SI request is received by the UE (710). After receiving the acknowledgement for SI request, for acquiring the requested SI message, UE shall receive the PDCCH containing a scheduling RNTI, i.e., SI-RNTI. That is, the UE monitors the PDCCH by decoding the PDCCH with the SI-RNTI. The UE monitors the PDCCH from the start of the first SI-window after receiving acknowledgment for SI request and continues until the end of the SI-window whose absolute length in time is given by si-WindowLength, or until the SI message was received (720). In other words, immediately after receiving acknowledgment for SI request the UE monitors the PDCCH from the start of the SI-window and continues until the end of the SI-window whose absolute length in time is given by si-WindowLength, or until the SI message was received (720).

If the SI message was received, the UE determines that SI message reception is successfully completed (730, 740). On the other hand, if the SI message was not received by the end of the SI-window and there are more SI window occasions left in current modification period (750), the UE repeats reception at the next SI window occasion for the concerned SI message in the current modification period (770). If there are no more SI window occasions left in current modification period (750), the UE determines that SI message reception is not successful and may resend the SI request (760).

It is to be noted that procedure explained in FIGS. 6 and 7 can also be used upon receiving acknowledgment for SI request wherein SI request is transmitted to gNB using dedicated RRC signaling message wherein RRCSystemInfoRequest is transmitted in dedicated UL grant. In this case SI request acknowledgement can be an RRC message or RRC Reconfiguration message. FIGS. 6 and 7 can also be used upon receiving acknowledgment for SI request wherein SI request is transmitted to gNB in MsgA of 2 step contention based random access procedure. In two step CBRA, first message (i.e., MsgA) consists of random access preamble transmitted on PRACH occasion and MAC PDU transmitted in PUSCH occasion. MAC PDU includes CCCH SDU which includes RRCSystemInfoRequest. In response to MsgA UE receives MsgB. In this case SI request acknowledgment is MsgB. MsgB including the contention resolution identity which matches the first 48 bits of CCCH SDU transmitted in MsgA is considered as SI request acknowledgment.

Hereinafter, operations of gNB according to the embodiments are described.

After transmitting acknowledgment for SI request to the UE in modification period N:
  if there is at least one remaining SI Window of the requested SI message in modification period N, gNB transmits requested SI message in SI window(s) of the requested SI message in the modification period N.
  Otherwise, gNB transmits requested SI message in SI window(s) of the requested SI message in the modification period N+1.

In another embodiment, after transmitting the acknowledgement for SI request gNB transmits the requested SI message in SI window(s) of the current modification period i.e., the modification period in which acknowledgement for SI request is sent.

Embodiment 1-2

Figure 8:
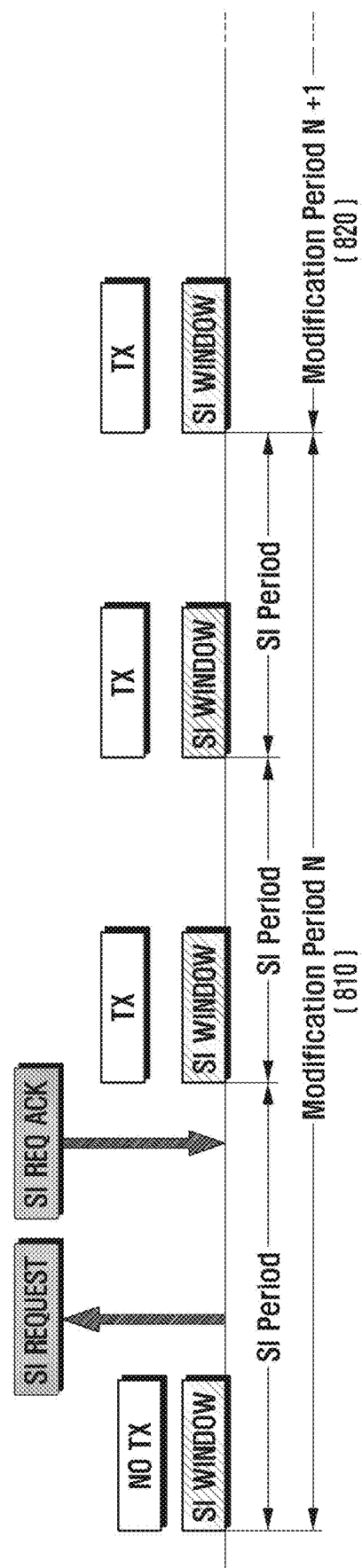
FIG. 8 illustrates another example of monitoring SI window according to an embodiment of the disclosure.
Figure 9:
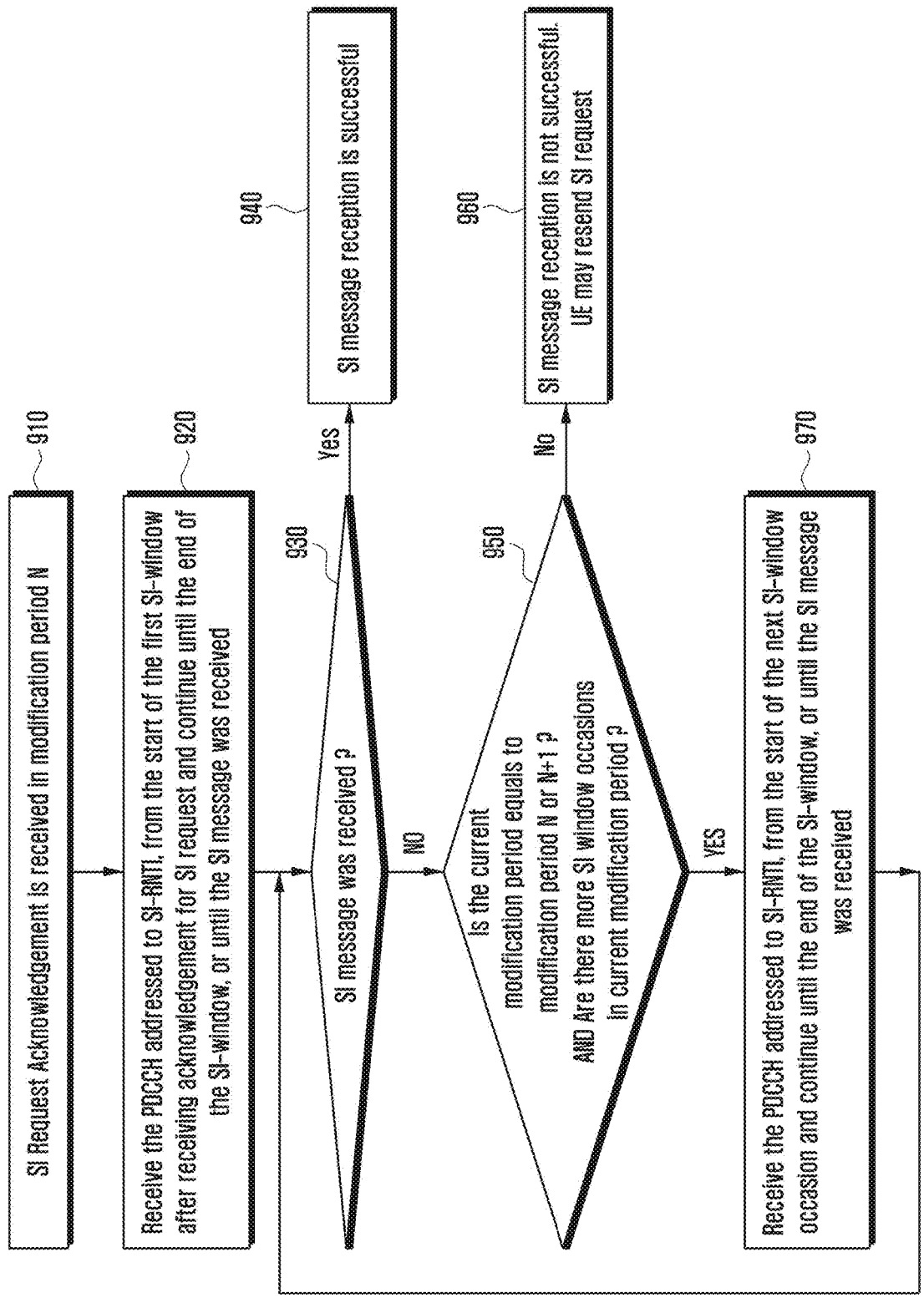
FIG. 9 illustrates another example of monitoring SI window according to an embodiment of the disclosure.

FIGS. 8 and 9 illustrate other examples of monitoring SI window according to various embodiments of the disclosure.

In another embodiment of the disclosure, it is proposed that after receiving acknowledgment for SI request, UE determines the SI window(s) to monitor as follows:
  After receiving acknowledgment for SI request in modification period N (910):
  UE monitors the SI window(s) of the requested SI message in the modification period N and N+1. This procedure is illustrated in FIG. 8, 9. After receiving the acknowledgement for SI request in modification period N (910), for acquiring the requested SI message, UE shall receive the PDCCH containing a scheduling RNTI, i.e., SI-RNTI. That is, the UE monitors the PDCCH by decoding the PDCCH with the SI-RNTI. The UE monitors the PDCCH from the start of the first SI-window after receiving acknowledgment for SI request and continues until the end of the SI-window, or until the SI message was received (920).
  If the SI message was received, the UE determines that SI message reception is successfully completed (930, 940). On the other hand, if the SI message was not received by the end of the SI-window of modification period N or N+1 and there are more SI window occasions left in the modification period N or N+1 (950), the UE repeats reception at the next SI window occasion for the concerned SI message in the modification period N or N+1 (970). This procedure is also illustrated in FIG. 8, e.g., 810, 820. If there are no more SI window occasions left in the modification period N or N+1 (950), the UE determines that SI message reception is not successful and may resend the SI request (960).

Hereinafter, operations of gNB according to the embodiments are described. * After transmitting acknowledgment for SI request to the UE in modification period N:
  gNB transmits requested SI message in SI window(s) of the requested SI message in the modification period N and N+1.

It is to be noted that procedure explained in FIGS. 8 and 9 can also be used upon receiving acknowledgment for SI request wherein SI request is transmitted to gNB using dedicated RRC signaling message wherein RRCSystemInfoRequest is transmitted in dedicated UL grant. In this case, SI request acknowledgement can be an RRC message or RRC Reconfiguration message. FIGS. 8 and 9 can also be used upon receiving acknowledgment for SI request wherein SI request is transmitted to gNB in MsgA of 2 step contention based random access procedure. In two step CBRA, first message (i.e., MsgA) consists of random access preamble transmitted on PRACH occasion and MAC PDU transmitted in PUSCH occasion. MAC PDU includes CCCH SDU which includes RRCSystemInfoRequest. In response to MsgA UE receives MsgB. In this case SI request acknowledgment is MsgB. MsgB including the contention resolution identity which matches the first 48 bits of CCCH SDU transmitted in MsgA is considered as SI request acknowledgment.

Embodiment 1-3

In another embodiment of the disclosure, it is proposed that after receiving acknowledgment for SI request, UE determines the SI window(s) to monitor as follows:
  After receiving acknowledgment for SI request in modification period N:
  if there are at least 'X' remaining SI Window of the requested SI message in modification period N, UE monitors the SI window(s) of the requested SI message in the modification period N.
  Otherwise, UE monitors the SI window(s) of the requested SI message in the modification period N and N+1.

Hereinafter, operations of gNB according to the embodiments are described.
  After transmitting acknowledgment for SI request in modification period N:
  if there are at least 'X' remaining SI Window of the requested SI message in modification period N, gNB transmits requested SI message in SI window(s) of the requested SI message in the modification period N.
  Otherwise, gNB transmits requested SI message in SI window(s) of the requested SI message in the modification period N and N+1

It is to be noted that procedure explained in above embodiments (1-1, 1-2 and 1-3) can also be used upon receiving acknowledgment for SI request wherein SI request is transmitted to gNB using dedicated RRC signaling message wherein RRCSystemInfoRequest is transmitted in dedicated UL grant. In this case SI request acknowledgement can be an RRC message or RRC Reconfiguration message. embodiments (1-1, 1-2 and 1-3) can also be used upon receiving acknowledgment for SI request wherein SI request is transmitted to gNB in MsgA of 2 step contention based random access procedure. In two step CBRA, first message (i.e., MsgA) consists of random access preamble transmitted on PRACH occasion and MAC PDU transmitted in PUSCH occasion. MAC PDU includes CCCH SDU which includes RRCSystemInfoRequest. In response to MsgA UE receives MsgB. In this case SI request acknowledgment is MsgB. MsgB including the contention resolution identity which matches the first 48 bits of CCCH SDU transmitted in MsgA is considered as SI request acknowledgment.

Embodiment 2—Beam Failure Recovery

In a beamformed system, beam failure recovery procedure is used to recover beam upon beam failure detection. The UE may be configured by radio resource control (RRC) signaling with a beam failure recovery procedure. The beam failure recovery procedure is used for indicating to the serving gNB of a new synchronization signal block (SSB) or channel state information reference signal (CSI-RS) when beam failure is detected on the serving SSB(s)/CSI-RS(s). Beam failure is detected by the UE by counting beam failure instance indication. The UE operation for beam failure detection and recovery in 5G system is as follows:
  If beam failure instance is detected: UE start or restart the beamFailureDetectionTimer and increment BFI_ COUNTER by 1.
    if BFI_COUNTER>=beamFailureInstanceMaxCount:
    if beamFailureRecoveryConfig is configured:
      start the beamFailureRecoveryTimer, if configured;
      initiate a Random Access procedure on the SpCell (i.e., special cell including primary cell (PCell) and primary secondary cell (pSCell)) by applying the parameters powerRampingStep, preambleReceivedTargetPower, and preambleTransMax configured in beamFailureRecoveryConfig.

During the random access procedure, if contention free (CF) resources are configured in beamFailureRecoveryConfig and criteria to select them is met, select CF resources. Otherwise select contention based (CB) resources.

else:
   initiate a Random Access procedure on the SpCell.
     During the random access procedure, CB random access resources are selected.

If the Random Access procedure is successfully completed: stop the beamFailureRecoveryTimer, if configured; and consider the Beam Failure Recovery procedure successfully completed.

In the fifth generation wireless communication system, bandwidth adaptation (BA) is supported. With BA, a UE's transmission bandwidth and reception bandwidth does not need to be as large as the bandwidth of the cell and can be adjusted as followings: the width of the bandwidth can be ordered to change (e.g., to shrink during period of low activity to save power); the location of the bandwidth can move in the frequency domain (e.g., to increase scheduling flexibility); and the subcarrier spacing of the bandwidth can be ordered to change (e.g., to allow different services). A subset of the total cell bandwidth of a cell is referred to as a Bandwidth Part (BWP) and BA is achieved by configuring the UE with at least one BWP(s) and telling the UE which of the configured BWPs is currently active. There is one active downlink (DL) BWP and one active uplink (UL) BWP. A Serving Cell (i.e., PCell or SCell) may be configured with one or more BWPs, and for an activated serving cell, there is always one active DL BWP and one active UL BWP at any point in time.

In a cell, gNB periodically broadcasts SSBs (i.e., SS blocks). SSB comprises primary synchronization signal (PSS), secondary synchronization signal (SSS) and physical broadcast channel (PBCH). SSBs do not occupy the full channel bandwidth. According to current design, if SSBs are not located within the BWP, contention based random access (CBRA) resources cannot be configured in that BWP. Additionally, contention free random access (CFRA) resources can be configured in a BWP only if CBRA resources are configured in that BWP. The consequence of this design is that if SSBs are not located in active DL BWP, random access channel (RACH) occasions cannot be configured in active UL BWP and hence CFRA cannot be used for beam failure recovery (BFR).

Embodiment 2-1

Figure 10:
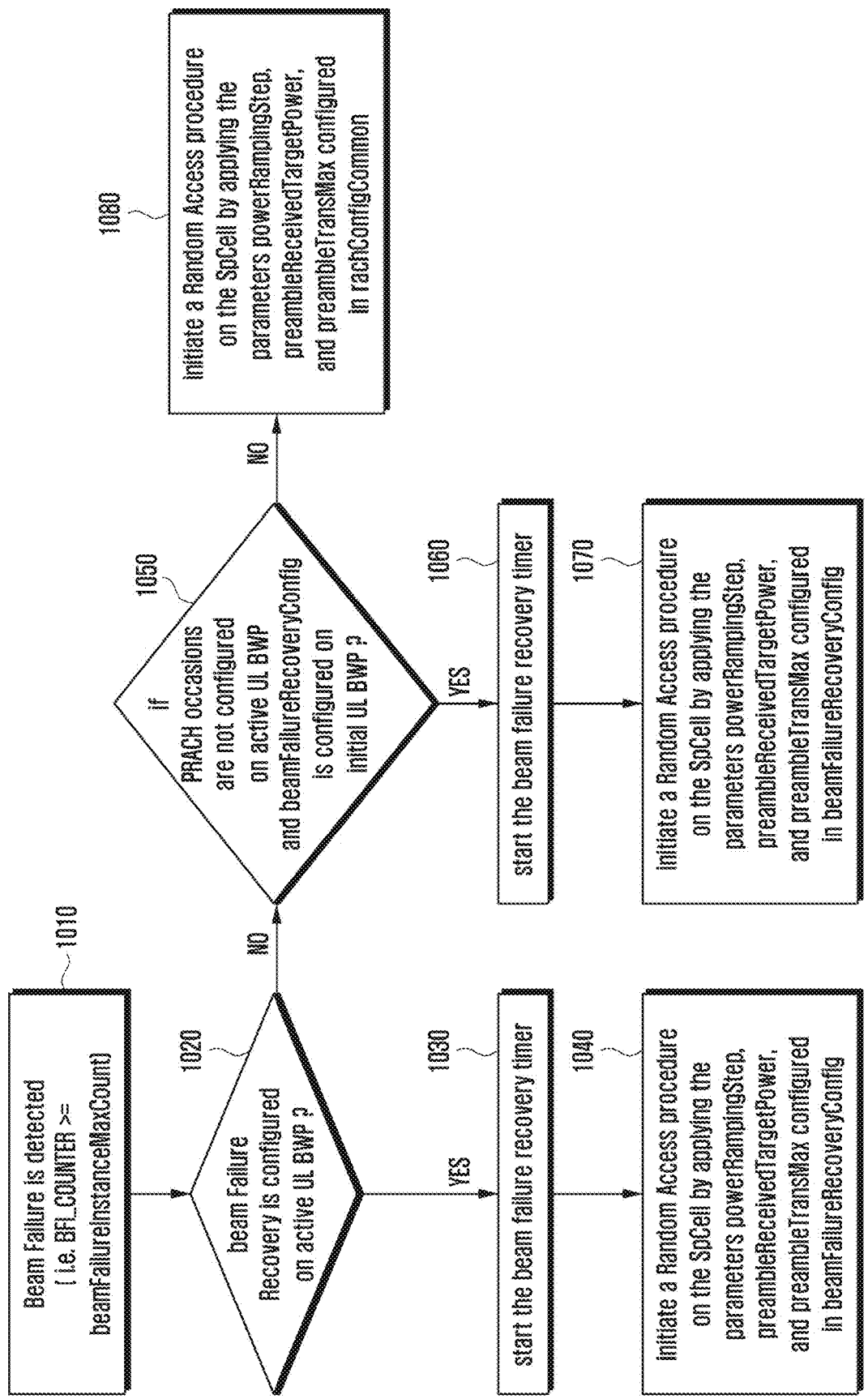
FIG. 10 illustrates an example of performing a beam failure recovery according to an embodiment of the disclosure.

FIG. 10 illustrates an example of performing a beam failure recovery according to an embodiment of the disclosure.

In an embodiment of the disclosure, we propose the following procedure for initiating random access procedure for beam failure recovery. Note that in below procedure, if PRACH occasions are not configured on active UL BWP, UE will also switch to initial DL BWP and initial UL BWP.
   Upon beam failure detection (i.e., BFI_COUNTER>=beamFailureInstanceMaxCount) (1010):
   if beamFailureRecoveryConfig is configured on active UL BWP (1020); or if PRACH occasions are not configured on active UL BWP and beamFailureRecoveryConfig is configured on initial UL BWP (1050):
   start the beamFailureRecoveryTimer (1030, 1060);
   initiate a Random Access procedure on the SpCell by applying the parameters powerRampingStep, preambleReceivedTargetPower, and preambleTransMax configured in beamFailureRecoveryConfig (1040, 1070).
   If CF resources are configured in beamFailureRecoveryConfig and criteria (i.e., there is at least one SSB/CSI-RS amongst SSBs/CSI-RSs for which CF resources are provided) with reference signal received power (RSRP) above a threshold to select them is met, select CF resources. Otherwise select CB resources
else (1020, 1050):
   initiate a Random Access procedure on the SpCell by applying the parameters powerRampingStep, preambleReceivedTargetPower, and preambleTransMax configured in rachConfigCommon (1080)
Note: During the random access procedure, CB random access resources are selected Embodiment 2-2

In this embodiment of the disclosure, if PRACH occasions are not configured in active UL BWP, BWP configuration of active UL BWP may include the BWP ID (beamFailureRecoveryBWPId) of the BWP where the BFR should be initiated upon beam failure detection. The detail procedure is as follows:
   Upon beam failure detection (i.e., BFI_COUNTER>=beamFailureInstanceMaxCount):
   if beamFailureRecoveryConfig is configured on active UL BWP; or
   if PRACH occasions are not configured on active BWP and beamFailureRecoveryConfig is configured on BWP indicated by beamFailureRecoveryBWPId:
   start the beamFailureRecoveryTimer;
   initiate a Random Access procedure on the SpCell by applying the parameters powerRampingStep, preambleReceivedTargetPower, and preambleTransMax configured in beamFailureRecoveryConfig.
   If CF resources are configured in beamFailureRecoveryConfig and criteria (i.e., there is at least one SSB/CSI-RS amongst SSBs/CSI-RSs for which CF resources are provided) with RSRP above a threshold to select them is met, select CF resources. Otherwise select CB resources
else:
   initiate a Random Access procedure on the SpCell by applying the parameters powerRampingStep, preambleReceivedTargetPower, and preambleTransMax configured in rachConfigCommon
Note: During the random access procedure, CB random access resources are selected
Upon initiation of the Random Access procedure on a Serving Cell, the medium access control (MAC) entity shall for this Serving Cell:
if PRACH occasions are not configured for the active UL BWP:
   if the Random Access procedure is initiated for BFR and beamFailureRecoveryConfig is configured on BWP indicated by beamFailureRecoveryBWPId:
   switch the active UL BWP to BWP indicated by beamFailureRecoveryBWPId;

switch the active DL BWP to BWP indicated by beamFailureRecoveryBWPId
else:
    switch the active UL BWP to BWP indicated by initialUplinkBWP;
    if the Serving Cell is a SpCell:
        switch the active DL BWP to BWP indicated by initialDownlinkBWP.

Embodiment 2-3

In this embodiment of the disclosure, if PRACH occasions are not configured in active UL BWP, UE performs beam failure recovery on BWP which includes reference signals (RSs) which are quasi-collocated (QCLed) with RSs in active DL BWP. The QCL relation can be signaled by gNB. The detail procedure is as follows:
Upon beam failure detection (i.e., BFI_COUNTER>=beamFailureInstanceMaxCount):
if beamFailureRecoveryConfig is configured on active UL BWP; or
if PRACH occasions are not configured on active BWP and beamFailureRecoveryConfig is configured on BWP which includes RSs which are QCLed with RSs in active BWP:
    start the beamFailureRecoveryTimer;
    initiate a Random Access procedure on the SpCell by applying the parameters powerRampingStep, preambleReceivedTargetPower, and preambleTransMax configured in beamFailureRecoveryConfig.
    If CF resources are configured in beamFailureRecoveryConfig and criteria (i.e., there is at least one SSB/CSI-RS amongst SSBs/CSI-RSs for which CF resources are provided) with RSRP above a threshold to select them is met, select CF resources. Otherwise select CB resources
else:
    initiate a Random Access procedure on the SpCell by applying the parameters powerRampingStep, preambleReceivedTargetPower, and preambleTransMax configured in rachConfigCommon
Note: During the random access procedure, CB random access resources are selected
Upon initiation of the Random Access procedure on a Serving Cell, the MAC entity shall for this Serving Cell:
    if PRACH occasions are not configured for the active UL BWP:
        if the Random Access procedure is initiated for BFR and beamFailureRecoveryConfig is configured on BWP which includes RSs which are QCLed with RSs in active BWP:
            switch the active UL BWP to BWP indicated by beamFailureRecoveryBWPId;
            switch the active DL BWP to BWP indicated by beamFailureRecoveryBWPId
        else:
            switch the active UL BWP to BWP indicated by initialUplinkBWP;
            if the Serving Cell is a SpCell:
                switch the active DL BWP to BWP indicated by initialDownlinkBWP.

Embodiment 3—Cell Reselection while On-Demand SI Request is Ongoing

Figure 11:
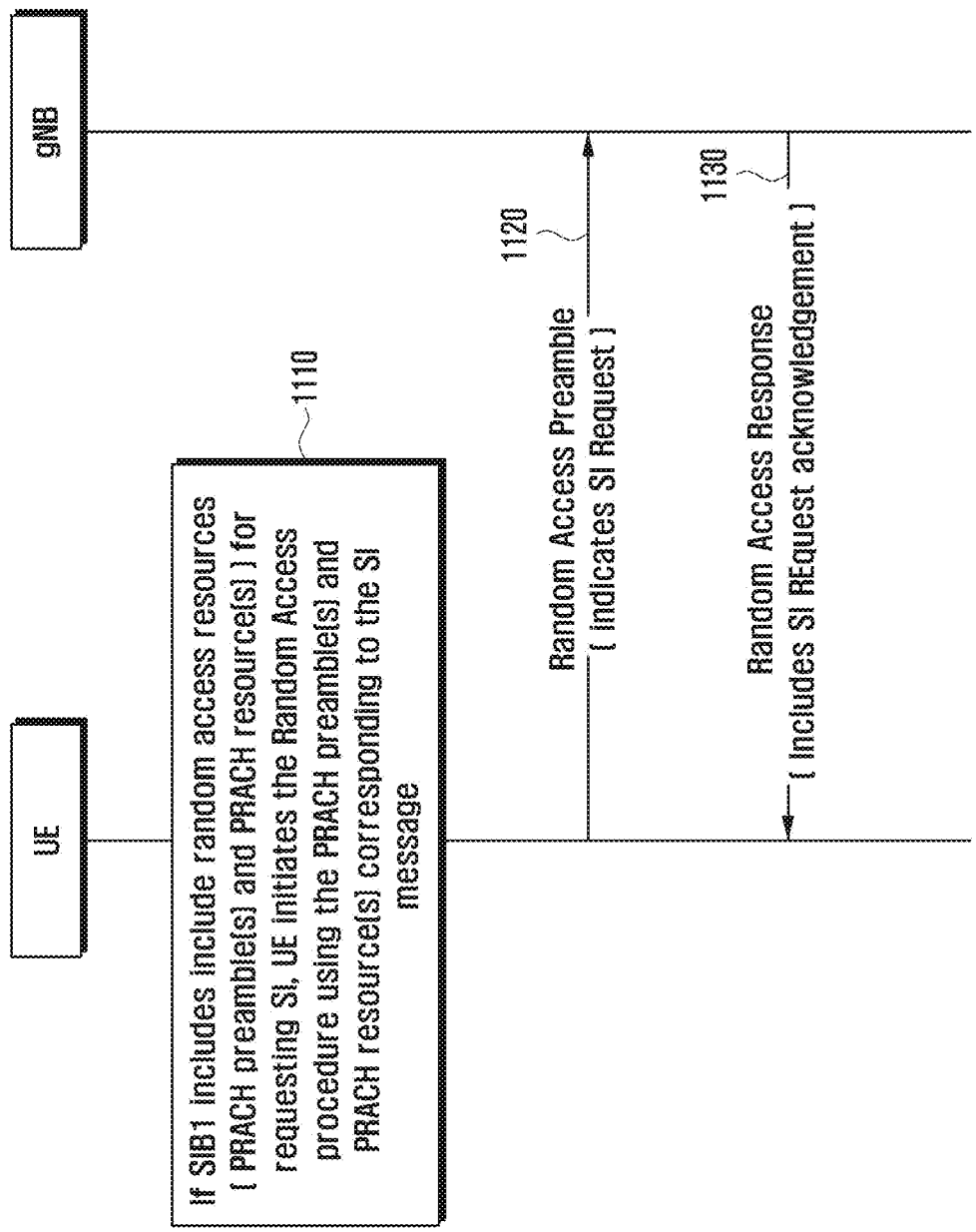
FIG. 11 illustrates an example of performing a cell reselection while an on-demand SI request is ongoing according to an embodiment of the disclosure.
Figure 12:
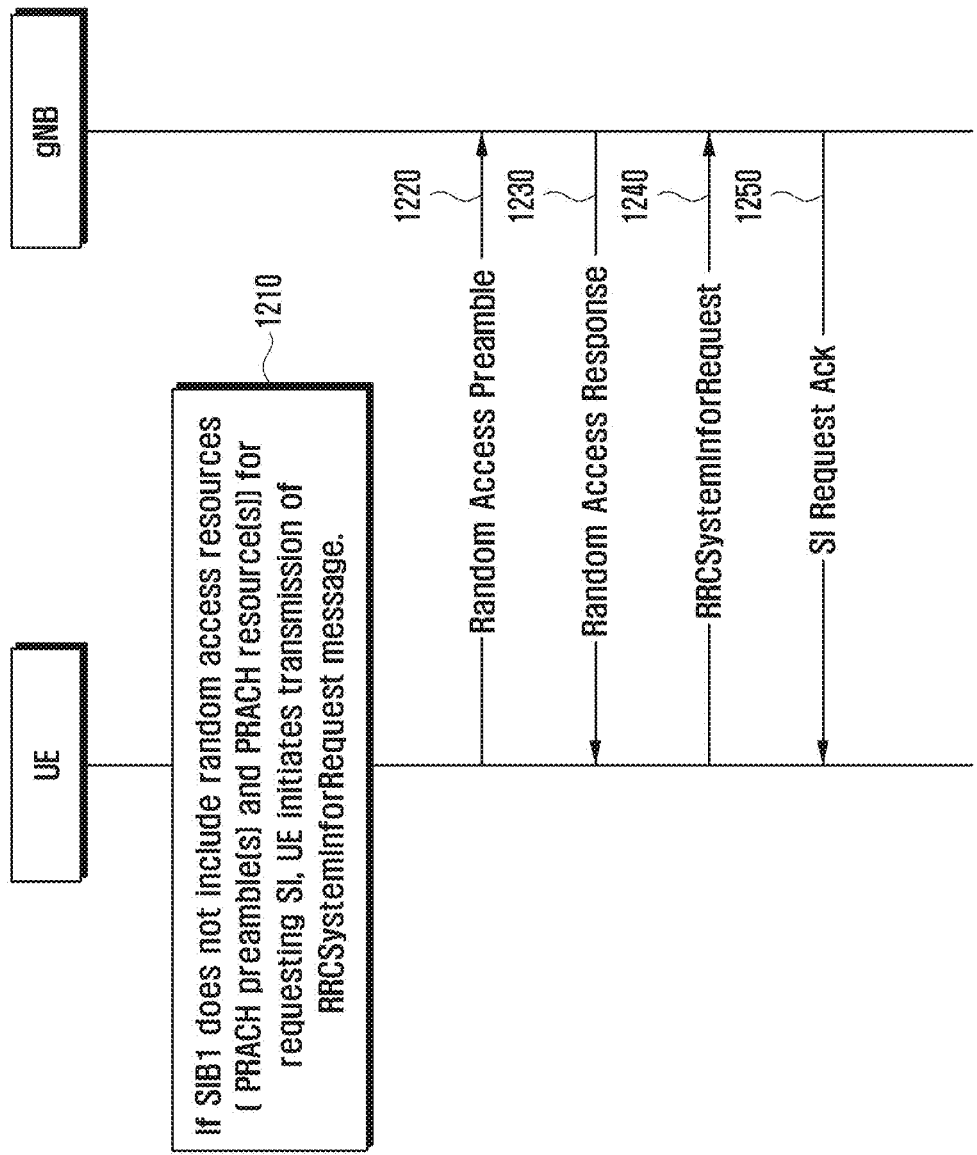
FIG. 12 illustrates another example of performing a cell reselection while an on-demand SI request is ongoing according to an embodiment of the disclosure.
Figure 13:
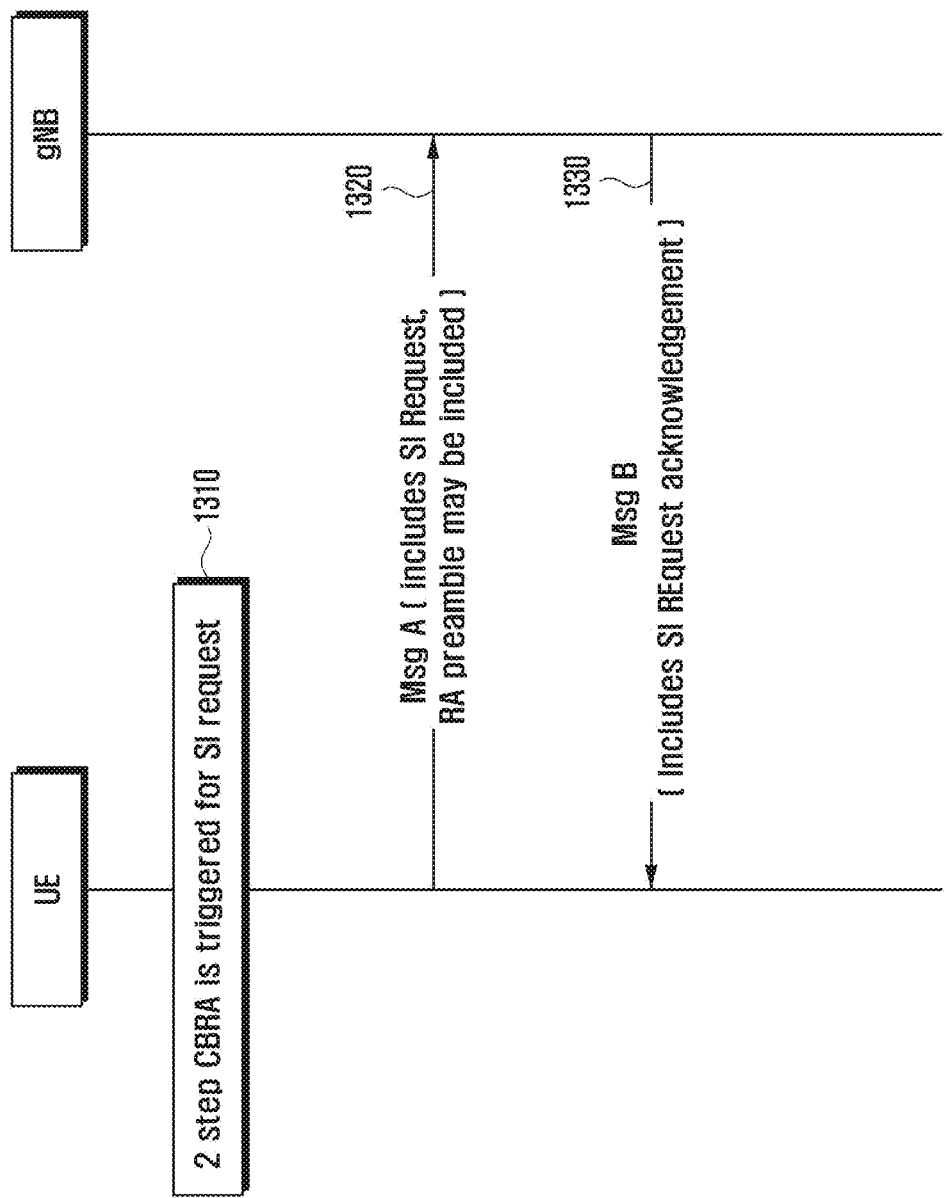
FIG. 13 illustrates another example of performing a cell reselection while an on-demand SI request is ongoing according to an embodiment of the disclosure.

FIGS. 11, 12, and 13 illustrate examples of performing a cell reselection while an on-demand SI request is ongoing according to various embodiments of the disclosure.

RRC initiates RA procedure for Msg1 based SI Request or RRC initiates transmission of RRCSystemInfoRequest message (i.e., Msg3 based SI request or MsgA based SI request). RRC is waiting for acknowledgment for SI request and Cell reselection occurs during the waiting. In this scenario, based on current procedure, ongoing RA procedure will continue on the reselected cell using the random access resources of previous cell. This is not desired behavior and will affect the random access operation of other UEs in reselected cell. This will also cause interference in reselected cell.

MAC Handling: It would be sufficient to just reset the MAC in above scenario. There is no need to release the MAC configuration. If MAC configuration is released, INACTIVE UEs may be impacted (MAC configuration in AS context may be wrongly discarded).

radio link control (RLC) Handling: After the RRC initiates transmission of RRCSystemInformationRequest, RRCSystemInformationRequest message is delivered to RLC transparent mode (TM) entity buffer. If cell reselection occurs before the MAC has received random access response (RAR), RRCSystemInformationRequest message in RLC buffer should be discarded. Otherwise this may be wrongly transmitted later (e.g., when connection is established or resumed) after cell reselection.

So, in an embodiment the disclosure, if cell reselection occurs while the UE is waiting for acknowledgment for SI request (or RRCSystemInfoRequest), UE shall reset MAC. In other words, after initiating Msg1 based SI Request by receiving random access resources from SIB 1 (1110, 1120 in FIG. 11), or after initiating transmission of RRCSystemInfoRequest message by determining that SIB1 does not include random access resources (1210, 1220, 1230, 1240 in FIG. 12), or after initiating 2 step RA for SI request when 2 step CBRA is triggered for SI request (1310, 1320 in FIG. 13), if cell reselection occurs before the UE receives acknowledgment for SI request (or RRCSystemInfoRequest) (1130, 1250, 1330), UE shall reset MAC. The detailed operation after cell reselection is explained in embodiments below.

Embodiment 3-1

1. Cell reselection occurs during ongoing random access procedure (i.e., random access procedure can be 2 step random access procedure or 4 step random access procedure)
    A. If the random access procedure is ongoing for RRC setup (i.e., timer T300 is running), perform the 1st set of operations
    i. 1st set of operations
    1) reset MAC;
    2) stop all timers that are running except T320 and T325;
    3) discard any stored AS context, fullI-RNTI, shortI-RNTI-Value, ran-PagingCycle and ran-NotificationAreaInfo;
    4) discard the AS security context including the $K_{RRCenc}$ key, the $K_{RRCint}$, the $K_{UPint}$ key and the $K_{UPenc}$ key, if stored;
    5) release all radio resources, including release of the RLC entity, the MAC configuration and the associated packet data convergence protocol (PDCP) entity and service data adaptation protocol (SDAP) for all established radio bearers (RBs);
    6) indicate the release of the RRC connection to upper layers together with the release cause set to connection failure;

7) enter RRC_IDLE and perform procedures as specified in TS 38.304;
  B. If the random access procedure is ongoing for RRC resume (i.e., timer 319 is running), perform the 2nd set of operations
i) 2nd set of operations
1) set the variable pendingRnaUpdate to 'FALSE', if that is set to TRUE;
2) reset MAC;
3) stop all timers that are running except T320 and T325;
4) discard any stored AS context, fullI-RNTI, shortI-RNTI-Value, ran-PagingCycle and ran-NotificationAreaInfo;
5) discard the AS security context including the $K_{RRCenc}$ key, the $K_{RRCint}$, the $K_{UPint}$ key and the $K_{UPenc}$ key, if stored;
6) release all radio resources, including release of the RLC entity, the MAC configuration and the associated PDCP entity and SDAP for all established RBs;
7) indicate the release of the RRC connection to upper layers together with the release cause set to resume failure;
8) enter RRC_IDLE and perform procedures as specified in TS 38.304;
  C. If the random access procedure is ongoing for SI request (i.e., RRC is waiting for SI request ack), perform the 3rd set of operations
i. 3rd set of operations
1) reset MAC;
2) RLC handling: as described in embodiments below Embodiment 3-2

The UE shall:
1> if cell reselection occurs while waiting for the acknowledgment for SI request or RRCSystemInfoRequest:
2> reset MAC, release the MAC configuration and re-establish RLC for all RBs that are established;
This may only be applied to UE in idle state.

Embodiment 3-31

The UE shall:
1> if cell reselection occurs while waiting for the acknowledgment for SI request or RRCSystemInfoRequest message:
2> reset MAC, release the MAC configuration;
2> if waiting for the acknowledgment of RRCSystemInfoRequest message
3> re-establish RLC for all RBs that are established;
This may only be applied to UE in idle state.

Embodiment 3-4

The UE shall:
1> if cell reselection occurs while waiting for the acknowledgment for SI request or RRCSystemInfoRequest message:
2> reset MAC;
2> if waiting for the acknowledgment of RRCSystemInfoRequest message:
3> release the RLC entity and the associated PDCP entity and SDAP for all established RBs;
OR The UE shall:
1> if cell reselection occurs while waiting for the acknowledgment for SI request or RRCSystemInfoRequest message:
2> reset MAC;
2> if waiting for the acknowledgment of RRCSystemInfoRequest message:
3> release RLC entity for SRB 0 or discard all contents in RLC entity for SRB 0;
OR
The UE shall:
1> if cell reselection occurs while waiting for the acknowledgment for SI request or RRCSystemInfoRequest message:
2> reset MAC;
2> if waiting for the acknowledgment of RRCSystemInfoRequest message:
3> release the RLC entity and the associated PDCP entity and SDAP for SRB 0;
OR
The UE shall:
1> if cell reselection occurs while waiting for the acknowledgment for SI request or RRCSystemInfoRequest message:
2> reset MAC;
2> release the RLC entity and the associated PDCP entity and SDAP for all established RBs;
OR
The UE shall:
1> if cell reselection occurs while waiting for the acknowledgment for SI request or RRCSystemInfoRequest message:
2> reset MAC;
2> release RLC entity for SRB 0 or discard all contents in RLC entity for SRB 0;
OR
The UE shall:
1> if cell reselection occurs while waiting for the acknowledgment for SI request or RRCSystemInfoRequest message:
2> reset MAC;
2> release the RLC entity and the associated PDCP entity and SDAP for SRB 0;
This may only be applied to UE in idle state.
In all embodiments about if UE is in idle state, MAC configuration may also be released.

Figure 14:
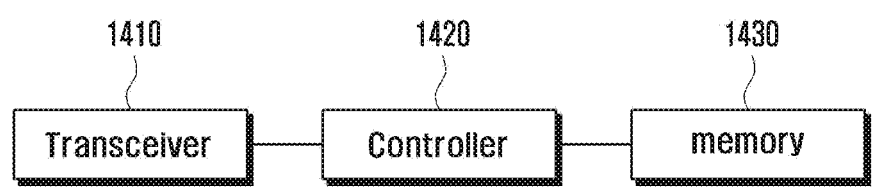
FIG. 14 is a block diagram of a terminal according to an embodiment of the disclosure.

FIG. 14 is a block diagram of a terminal according to an embodiment of the disclosure.

Referring to FIG. 14, a terminal includes a transceiver 1410, a controller 1420 and a memory 1430. The transceiver 1410, the controller 1420 and the memory 1430 are configured to perform the operations of the UE illustrated in the figures, e.g., FIGS. 1 to 13, or described above. Although the transceiver 1410, the controller 1420 and the memory 1430 are shown as separate entities, they may be realized as an single entity like an single chip. Or, the transceiver 1410, the controller 1420 and the memory 1430 may be electrically connected to or coupled with each other.

The transceiver 1410 may transmit and receive signals to and from other network entities, e.g., a BS.

The controller 1420 may control the UE to perform functions according to one of the embodiments described above. The controller 1420 may refer to a circuitry, an ASIC, or at least one processor.

In an embodiment, the operations of the terminal may be implemented using the memory 1430 storing corresponding program codes. Specifically, the terminal may be equipped with the memory 1430 to store program codes implementing desired operations. To perform the desired operations, the controller 1420 may read and execute the program codes stored in the memory 1430 by using a processor or a central processing unit (CPU).

Figure 15:
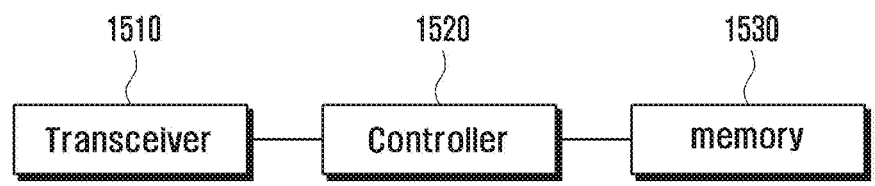
FIG. 15 is a block diagram of a base station according to an embodiment of the disclosure.

FIG. 15 is a block diagram of a BS according to an embodiment of the disclosure.

Referring to FIG. 15, a BS includes a transceiver 1510, a controller 1520 and a memory 1530. The transceiver 1510, the controller 1520 and the memory 1530 are configured to perform the operations of the network (e.g., gNB) illustrated in the figures, e.g., FIGS. 1 to 13, or described above. Although the transceiver 1510, the controller 1520 and the memory 1530 are shown as separate entities, they may be realized as a single entity like a single chip. The transceiver 1510, the controller 1520 and the memory 1530 may be electrically connected to or coupled with each other.

The transceiver 1510 may transmit and receive signals to and from other network entities, e.g., a terminal.

The controller 1520 may control the BS to perform functions according to one of the embodiments described above. The controller 1520 may refer to a circuitry, an ASIC, or at least one processor.

In an embodiment, the operations of the BS may be implemented using the memory 1530 storing corresponding program codes. Specifically, the BS may be equipped with the memory 1530 to store program codes implementing desired operations. To perform the desired operations, the controller 1520 may read and execute the program codes stored in the memory 1530 by using a processor or a CPU.

As described above, embodiments disclosed in the specification and drawings are merely used to specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. A method performed by a terminal in a wireless communication system, the method comprising:
    detecting a beam failure for a special cell (SpCell); and
    in case that a physical random access channel (PRACH) occasion is not configured for an active uplink (UL) bandwidth part (BWP) of the SpCell,
        switching the active UL BWP to an initial UL BWP and an active downlink (DL) BWP to an initial DL BWP; and
        performing a random access procedure for a beam failure recovery of the SpCell based on a first beam failure recovery configuration of the initial UL BWP.

2. The method of claim 1, further comprising:
    in case that the PRACH occasion is configured for the active UL BWP, performing the random access procedure for the beam failure recovery of the SpCell based on a second beam failure recovery configuration of the active UL BWP.

3. The method of claim 1, further comprising:
    in case that the PRACH occasion is configured for the active UL BWP, applying at least one of power ramping step parameter, preamble received target power parameter, or preamble transmission maximum parameter of a second beam failure recovery configuration for the random access procedure; and
    in case that the PRACH occasion is not configured for the active UL BWP, applying at least one of power ramping step parameter, preamble received target power parameter, or preamble transmission maximum parameter of the first beam failure recovery configuration for the random access procedure.

4. The method of claim 1, wherein a beam failure recovery timer is started based on an initiation of the random access procedure.

5. The method of claim 1, wherein the first beam failure recovery configuration and a second beam failure recovery configuration are received by a radio resource control (RRC) signaling for the initial UL BWP and the active UL BWP, respectively.

6. A method performed by a base station in a wireless communication system, the method comprising:
    transmitting, to a terminal, a radio resource control (RRC) signaling associated with a beam failure recovery; and
    in case that a physical random access channel (PRACH) occasion is not configured for an active uplink (UL) bandwidth part (BWP) of a special cell (SpCell),
        switching the active UL BWP to an initial UL BWP and an active downlink (DL) BWP to an initial DL BWP for the terminal which detected the beam failure recovery of the SpCell; and
        performing, with the terminal, a random access procedure for the beam failure recovery of the SpCell based on a first beam failure recovery configuration on the initial UL BWP.

7. The method of claim 6, further comprising:
    performing, with the terminal, the random access procedure for the beam failure recovery of the SpCell based on a second beam failure recovery configuration of the active UL BWP, in case that the PRACH occasion is configured for the active UL BWP.

8. The method of claim 6,
    wherein, in case that the PRACH occasion is configured for the active UL BWP, at least one of power ramping step parameter, preamble received target power parameter, or preamble transmission maximum parameter of a second beam failure recovery configuration is applied for the random access procedure, and
    wherein, in case that the PRACH occasion is not configured for the active UL BWP, at least one of power ramping step parameter, preamble received target power parameter, or preamble transmission maximum parameter of the first beam failure recovery configuration is applied for the random access procedure.

9. The method of claim 6, wherein a beam failure recovery timer is started based on an initiation of the random access procedure.

10. The method of claim 6, wherein the first beam failure recovery configuration and a second beam failure recovery configuration are transmitted by the RRC signaling for the initial UL BWP and the active UL BWP, respectively.

11. A terminal in a wireless communication system, the terminal comprising:
    a transceiver configured to transmit and receive a signal; and
    a controller configured to:
        detect a beam failure for a special cell (SpCell), and
        in case that a physical random access channel (PRACH) occasion is not configured for an active uplink (UL) bandwidth part (BWP) of the SpCell, switch the active UL BWP to an initial UL BWP and an active downlink (DL) BWP to an initial DL BWP, and perform a random access procedure for a beam failure recovery of the SpCell based on a first beam failure recovery configuration of the initial UL BWP.

12. The terminal of claim 11, wherein the controller is further configured to:

in case that the PRACH occasion is configured for the active UL BWP, perform the random access procedure for the beam failure recovery of the SpCell based on a second beam failure recovery configuration of the active UL BWP.

13. The terminal of claim 11, wherein the controller is further configured to:

in case that the PRACH occasion is configured for the active UL BWP, apply at least one of power ramping step parameter, preamble received target power parameter, or preamble transmission maximum parameter of a second beam failure recovery configuration for the random access procedure, and in case that the PRACH occasion is not configured for the active UL BWP, apply at least one of power ramping step parameter, preamble received target power parameter, or preamble transmission maximum parameter of the first beam failure recovery configuration for the random access procedure.

14. The terminal of claim 11, wherein a beam failure recovery timer is started based on an initiation of the random access procedure.

15. The terminal of claim 11, wherein the first beam failure recovery configuration and a second beam failure recovery configuration are received by a radio resource control (RRC) signaling for the initial UL BWP and the active UL BWP, respectively.

16. A base station in a wireless communication system, the base station comprising:

a transceiver configured to transmit and receive a signal; and a controller configured to:

transmit, to a terminal, a radio resource control (RRC) signaling associated with a beam failure recovery, and in case that a physical random access channel (PRACH) occasion is not configured for an active uplink (UL) bandwidth part (BWP) of a special cell (SpCell), switch the active UL BWP to an initial UL BWP and an active downlink (DL) BWP to an initial DL BWP for the terminal which detected the beam failure recovery of the SpCell, and perform, with the terminal, a random access procedure for the beam failure recovery of the SpCell based on a first beam failure recovery configuration on the initial UL BWP.

17. The base station of claim 16, wherein the controller is further configured to:

perform, with the terminal, the random access procedure for the beam failure recovery of the SpCell based on a second beam failure recovery configuration of the active UL BWP, in case that the PRACH occasion is configured for the active UL BWP.

18. The base station of claim 16, wherein, in case that the PRACH occasion is configured for the active UL BWP, at least one of power ramping step parameter, preamble received target power parameter, or preamble transmission maximum parameter of a second beam failure recovery configuration is applied for the random access procedure, and wherein, in case that the PRACH occasion is not configured for the active UL BWP, at least one of power ramping step parameter, preamble received target power parameter, or preamble transmission maximum parameter of the first beam failure recovery configuration is applied for the random access procedure.

19. The base station of claim 16, wherein a beam failure recovery timer is started based on an initiation of the random access procedure.

20. The base station of claim 16, wherein the first beam failure recovery configuration and a second beam failure recovery configuration are transmitted by the RRC signaling for the initial UL BWP and the active UL BWP, respectively.

* * * * *